(12) United States Patent
Chen et al.

(10) Patent No.: US 8,614,763 B2
(45) Date of Patent: Dec. 24, 2013

(54) AUTO-FOCUSING CAMERA MODULE

(75) Inventors: Yu-Han Chen, New Taipei (TW);
Yu-Chen Yao, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 76 days.

(21) Appl. No.: 13/476,031

(22) Filed: May 21, 2012

(65) Prior Publication Data

US 2013/0222674 A1    Aug. 29, 2013

(30) Foreign Application Priority Data

Feb. 23, 2012   (TW) .............................. 10110611 A

(51) Int. Cl.
*H04N 5/232*   (2006.01)
*H04N 5/228*   (2006.01)
*G06K 9/40*    (2006.01)
*G03B 3/10*    (2006.01)
*G03B 3/00*    (2006.01)

(52) U.S. Cl.
USPC .. 348/345; 348/222.1; 348/0.46; 348/208.12; 382/255; 382/264; 396/131; 396/103; 396/104; 396/93; 396/82

(58) Field of Classification Search
USPC ............ 348/208.99, 207.12, 222.1, 345–356, 348/208.14, 248; 382/255, 264; 396/79, 80, 396/82, 89, 93, 102, 103, 104, 131
See application file for complete search history.

(56) References Cited

U.S. PATENT DOCUMENTS

| | | | |
|---|---|---|---|
| 2006/0221226 A1* | 10/2006 | Yanof et al. | 348/242 |
| 2011/0242373 A1* | 10/2011 | Inoue et al. | 348/242 |
| 2011/0261252 A1* | 10/2011 | Chen | 348/335 |
| 2012/0007997 A1* | 1/2012 | Oikawa | 348/208.6 |
| 2012/0050580 A1* | 3/2012 | Iwasaki | 348/240.99 |

* cited by examiner

*Primary Examiner* — Tuan Ho
*Assistant Examiner* — Marly Camargo
(74) *Attorney, Agent, or Firm* — Altis Law Group, Inc.

(57) ABSTRACT

An auto-focusing camera module includes a lens module, an image sensor, a color separation unit, a controller, and a shape memory alloy. The lens module captures light signal of an object. The image sensor senses the light and forms an image. The color separation unit separates the image into red image, green image and blue image. The controller calculates MTF values of the image and determines a shooting distance between the lens module and the object. When the shooting distance is greater than a predetermined distance value, the controller processes the image according to the MTF values to compensate blurs of the image caused by out of focus; when the shooting distance is equal to or less than the predetermined distance value, the controller controls the shape memory alloy drive the lens module to an optimum focusing position for focus according to the MTF values.

15 Claims, 2 Drawing Sheets

AUTO-FOCUSING CAMERA MODULE

BACKGROUND

1. Technical Field

The present disclosure relates to camera modules, and particularly to an auto-focusing camera module.

2. Description of Related Art

Digital auto-focusing technology allows blurred images (out of focus images) to be processed by software modules, which may employ an extend depth of field (EDOF) technology, to get a sharper image. However, the digital auto-focusing technology does not work properly if an object distance (shooting distance) is short, e.g. less than 40 cm.

What is needed therefore is an auto-focusing camera module which can overcome the limitations described.

DETAILED DESCRIPTION

Figure 1:
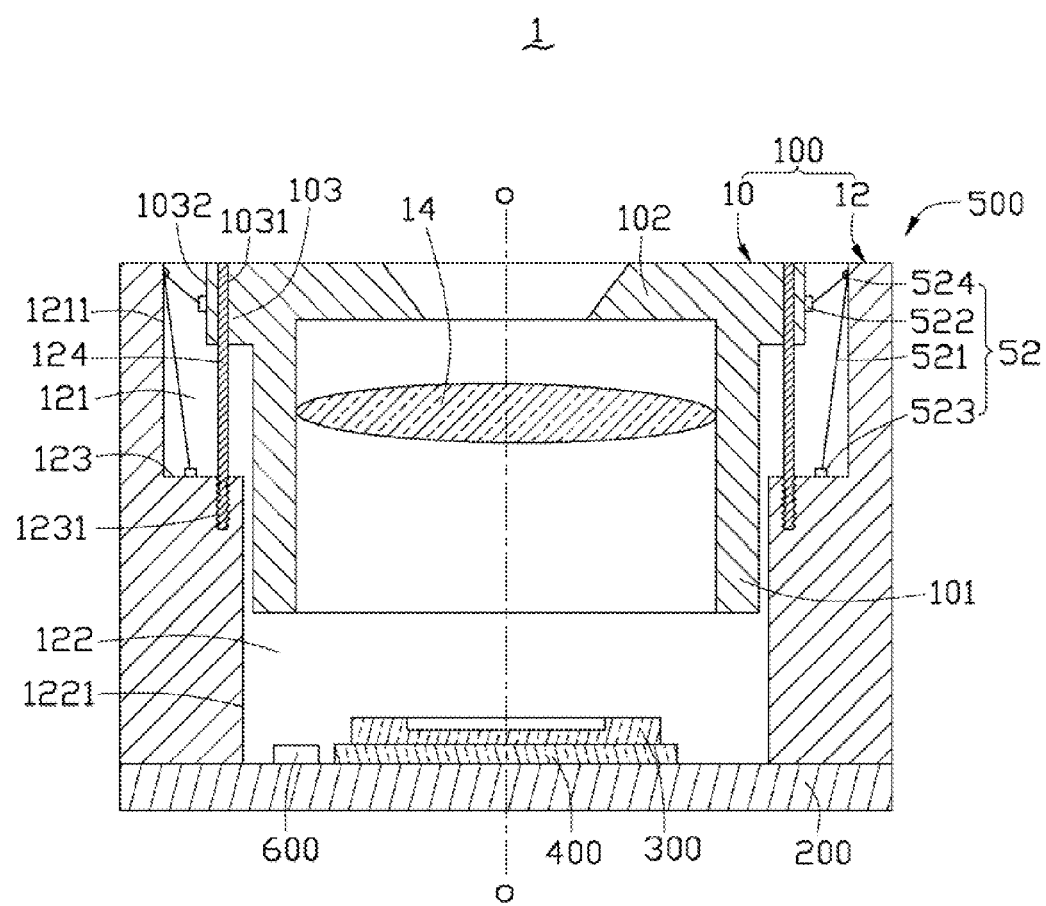
FIG. 1 is a cross-sectional view of an auto-focusing image module, according to an exemplary embodiment of the present disclosure.
Figure 2:
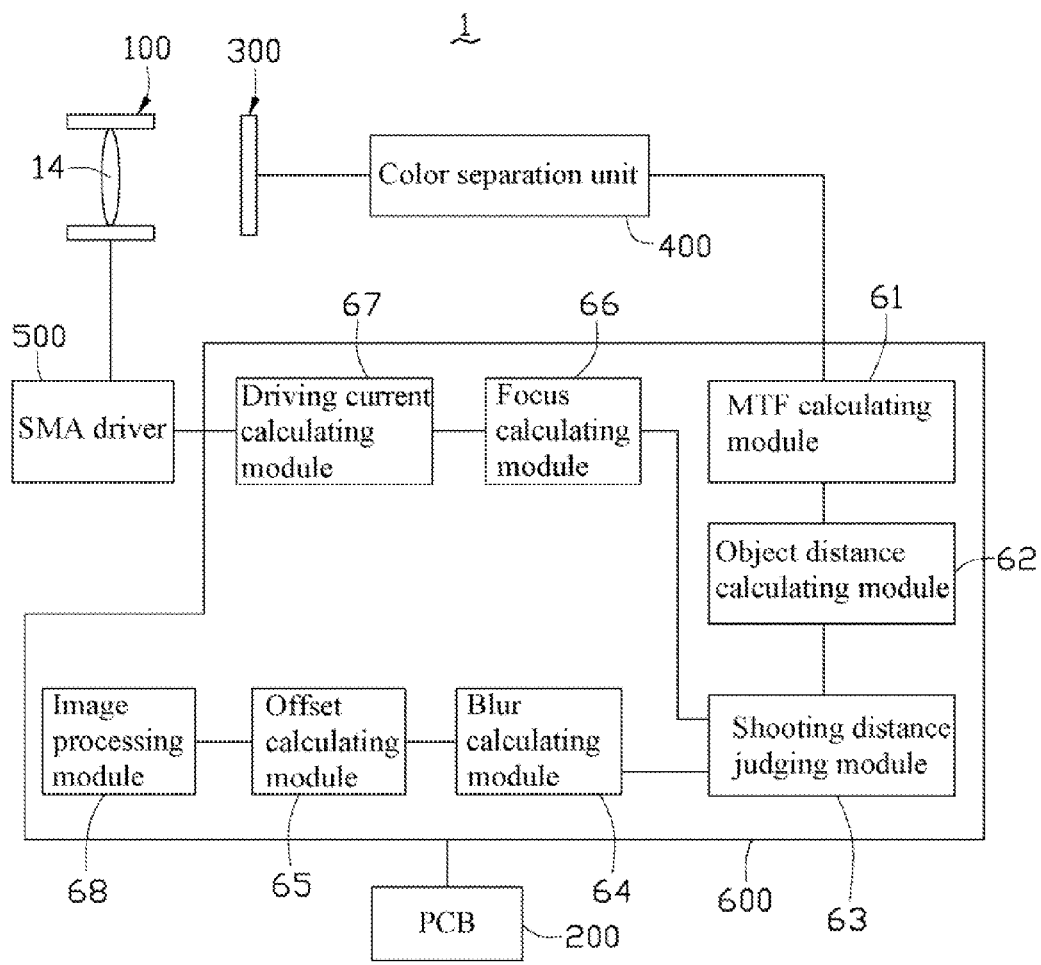
FIG. 2 is a functional block view of the auto-focusing image module of FIG. 1.

Referring to FIGS. 1 and 2, an auto-focusing camera module 1 according to an exemplary embodiment of the present disclosure is shown. The auto-focusing camera module 1 includes a lens module 100, a printed circuit board (PCB) 200, an image sensor 300, a color separation unit 400, a shape memory alloy (SMA) driver 500, and a controller 600.

The lens module 100 includes a lens barrel 10, a base 12, and at least one piece of lens 14 received in the lens barrel 10. The center axis of the lens 14 is defined as an optical axis OO of the lens module 100. The lens module 100 captures light signal of an object(s). In this embodiment, the lens 14 is an aspherical lens.

The lens barrel 10 is hollow and includes a cylindrical main portion 101, an annular cover portion 102 extending from one end of the main portion 101 to the optical axis OO, and an annular protruding portion 103 around the cover portion 102 and extending away from the optical axis OO. In this embodiment, the main portion 101, the cover portion 102, and the protruding portion 103 are integrally formed with each other. An outer diameter of the protrusion 103 is greater than an outer diameter of the main portion 101. The protruding portion 103 defines two guiding holes 1031 extending along a direction parallel to the optical axis OO. The two guiding holes 1031 pass through the protruding portion 103. The two guiding holes 1031 and the optical axis OO is arranged in the same plane. The protruding portion 103 includes a side surface 1032 which is substantially parallel to the optical axis OO.

The base 12 is generally tubular and defines an upper receiving hole 121 and a lower receiving hole 122 communicated and coaxial with the upper receiving hole 121. A diameter of the upper receiving hole 121 is greater than a diameter of the lower receiving hole 122 and the outer diameter of the protruding portion 103. The base 12 includes a cylindrical first inner surface 1211 on the upper receiving hole 121, a cylindrical second inner surface 1221 on the lower receiving hole 122, and a connection surface 123 connecting the first inner surface 1211 and the second inner surface 1221. The connection surface 123 is perpendicular to the optical axis OO.

The protruding portion 103 is received in the upper receiving hole 121 with the side surface 1032 facing the first inner surface 1211. The connection surface 123 faces the protruding portion 103 and defines two mounting holes 1231. Each mounting hole 1231 is a threaded blind hole and corresponds to a guiding hole 1031. The auto-focusing camera module 100 further includes two guide poles 124. Each guiding pole 124 includes a threaded end which is screwed in the mounting hole 1231 such that each guiding pole 124 is mounted to the base 12. The other end opposite to the threaded end of each guiding pole 124 is received in a corresponding guiding hole 1031. The diameter of the lower receiving hole 122 is slightly greater than the outer diameter of the main portion 101. The upper receiving hole 121 and the lower receiving hole 122 cooperatively receive the main portion 101. The lens barrel 10 is slidable under the guiding of the guiding poles 124.

The PCB 200 is mounted at one end of the base 12 and electrically connected to the image sensor 300, the color separation unit 400, the SMA driver 500, and the controller 600.

The image sensor 300 is received in the lower receiving hole 122 and mounted on the PCB 200. The image sensor 300 senses lights signal passing through the lens module 100 and converts the light signal into electrical signal to form images. The image sensor 300 includes a number of pixel units arranged in a sensing area, and each pixel unit includes a red pixel, a green pixel and a blue pixel. In one embodiment, the number of the pixel units 300 is higher than 2048×1536. In this illustrated embodiment, the image sensor 20 can be a charge-coupled device (CCD) or a complementary metal oxide semiconductor (CMOS). An image formed by the image sensor 300 comprises a number of image portions corresponding to the pixel units.

The color separation unit 400 is mounted on the PCB 200 and electrically connected to the image sensor 300. In alterative embodiments, the color separation unit 400 can be integrated in the image sensor 300. The color separation unit 400 separates an image formed by the image sensor 20 into red, green, and blue colors. In detail, each image portion of the image is separated into a red color part, a green color part, and a blue color part. The red color parts of the image portions construct the red image, the green parts of the image portions construct the green image, and the blue parts of the image portions construct the blue image.

The SMA driver 500 is mounted between the lens barrel 10 and the base 12. The SMA driver 500 includes two sub-driver assemblies 52. Each of the sub-driver assemblies 52 includes a SMA wire 521, a first fastening element 522, a second fastening element 523, and a hanging element 524. The SMA wire 521 can be made of nickel-titanium-base alloy or copper-base alloy. The first fastening element 522 is made of metal and mounted on the side surface 1032. The second fastening element 523 is also made of metal and mounted on the connection surface 123. The hanging element 524 is made of dielectric material and generally arched with two ends being mounted on the first inner surface 1211.

Each of the two ends of the SMA wire 521 is connected to one of the first fastening element 522 and the second fastening element 523. The SMA wire 521 is passed through the hanging element 522 and hanged on the hanging element 524 with the SMA wire 521 in a tense state. A distance between the hanging element 524 and the connection surface 123 is greater than a distance between the first fastening element 522 and the connection surface 123. The first fastening element 522, the second fastening element 523, and the hanging element 524 are generally positioned in a plane passing through the optical axis OO.

The two sub-driver assemblies 52 are symmetrically arranged along a diameter direction of the lens barrel 10. The lens barrel 10 is suspended and movable along the guide poles 124 in the base 12. The guide poles 124 can prevent the lens barrel 10 from rotating in the base 12. In alterative embodiments, the hang element 524 can be a hook.

The controller 600 is electrically connected to the color separation unit 400 and the SMA driver 500. The controller 600 includes a modulation transfer function (MTF) calculating module 61, an object distance calculating module 62, an shooting distance judging module 63, a blur calculating module 64, an offset calculating module 65, a focus calculating module 66, a driving current calculating module 67, and an image processing module 68.

The MTF calculating module 61 is electrically connected to the color separation unit 400. The object distance calculating module 62 is electrically connected to the MTF calculating module 61. The shooting distance judging module 63 is electrically connected to the object distance calculating module 62. The blur calculating module 64 and the focus calculating module 66 are electrically connected to the shooting distance judging module 63. The offset calculating module 65 is electrically connected to the blur calculating module 64 and the image processing module 68. The driving current calculating module 67 is electrically connected to the focus calculating unit 46 and the SMA driver 500.

The MTF calculating module 61 calculates the MTF values of each image portion of an image formed by the image sensor 300. In this embodiment, the MTF calculating module 61 respectively calculates MTF values of the red parts, the green parts, and the blue parts of each image portion.

The object distance calculating module 62 calculates an object distance of an object in each image portion of the image according to the MTF values calculated by the MTF calculating module 61.

The shooting distance judging module 63 determines a shooting distance according to the object distances of each image portion calculated by the object distance calculating module 61. The shooting distance is the distance between the object and the lens module 100. In detail, the shooting distance judging module 63 analyzes the object distances of each image portion calculated by the object distance calculating module 61, compares the analysis results with a predetermined distance value(s), and determines the shooting distance. In this embodiment, the shooting distance judging module 63 analyzes the object distances of the pixel units and generates a main object distance representing the distance-to-object distance of a main object in the image. In this embodiment, the predetermined distance value is 40 cm.

The blur calculating module 64 compares the MTF values of each image portion of the image calculated by the MTF calculating module 61 with corresponding predetermined MTF values, calculates the differences between the obtained MTF values and the predetermined MTF values, and generates blur quantities of each image portion of the image. Each of the predetermined MTF values is an MTF value when applied to the object in the image produces the sharpest image. The predetermined standard MTF values are different corresponding to different object distances. In this embodiment, the blur calculating module 64 calculates the blur quantities of the red part, the green part, and the blue part of each image portion. The blur calculating module 64 may select an on state or an off state for the blur calculating function thereof according to the shooting distance determined by the object distance judging module 63. In this embodiment, if the shooting distance is greater than the predetermined distance, the blur calculating module 64 switches on the blur calculating function, and if the shooting distance is equal to or less than the predetermined distance, the blur calculating module 64 switches off the blur calculating function.

The offset calculating module 65 calculates offsets to compensate for blurring of each image portion according to the calculated result of the blur calculating module 64. In this embodiment, the offset calculating module 65 calculated offsets of the red part, the green part and the blue part of each image portion.

The focus calculating module 66 calculates an optimum focusing position of the lens module 100 according to the calculated result of the object distance calculating module 62. The focus calculating module 66 may select an on state or an off state for the focus calculating function thereof according to the shooting distance determined by the object distance judging module 63. In this embodiment, if the shooting distance is equal to or less than the predetermined distance, the focus calculating module 66 switches on the focus calculating function; and if the shooting distance is greater than the predetermined distance, the focus calculating module 66 switches off the focus calculating function.

The driving current calculating module 67 calculates a driving current of the lens module 100 according to the optimum focusing position calculated by the focus calculating module 66.

The image processing module 68 processes the image according to the calculated result of the offset calculating module 65 to get a sharp processed image. In detail, the image processing module 68 compensates any blurring of each image portion of the image according to the offsets calculated by the offset calculating module 65. In this embodiment, the image processing module 68 compensates for the blurring of the red color portion, the green color portion, and the blue color portion of each image portion.

In use, the color separation unit 400 separates an image formed by the image sensor 300 into red, green and blue colors, the MTF calculating module 61 calculates MTF values of each image portion of the image, the object distance calculating module 62 calculates an object distance of an object in each image portion of the image, the shooting distance judging module 63 determines a shooting distance according to the object distances of each image portion.

If the shooting distance is greater than the predetermined distance, the blur calculating module 64 switches on and the focus calculating module 66 switches off. The blur calculating module 64 compares the MTF values of each image portion of the image calculated by the MTF calculating module 61 with corresponding predetermined MTF values, calculates the differences between the obtained MTF values and the predetermined MTF values, and generates blur quantities of each image portion of the image. The offset calculating module 65 calculates offsets to compensate for the blurring of each image portion according to the calculated result of the blur calculating module 64. The image processing module 68 processes the image according to the calculated result of the offset calculating module 65 to get a sharp processed image.

If the shooting distance is equal to or less than the predetermined distance, the blur calculating module 64 switches off and the focus calculating module 66 switches on. The focus calculating module 66 calculates an optimum focusing position of the lens module 100 according to the calculated result of the object distance calculating module 62. The driving current calculating module 67 calculates a driving current of the lens module 100 according to the optimum focusing position. The driving current calculating module 67 controls the PCB 200 to provide the driving current to each SMA wire 521 through the corresponding first fastening element 522 and the second fastening element 523. The metallographic of each SMA wire 521 is transferred from martensite to austenite when the corresponding SMA wire 521 is heated to a transformation temperature by the driving current. Each SMA wire 521 contracts and pulls the lens barrel 10 toward the image sensor 300, such that the lens barrel 10 moves along the optical axis OO to the optimum focusing position. When the driving current calculating module 67 controls the PCB 200 to stop providing the driving current to each SMA wire 521, the metallographic of each SMA wire 521 will be transferred from austenite to martensite and each SMA wire 521 is repositioned to the primary tense state.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An auto-focusing camera module, comprising:
   a lens module for capturing light signal of an object;
   an image sensor aligned with the lens module for sensing the light signal captured by the lens module and forming an image;
   a color separation unit electrically connected to the image sensor for separating the image into red image, green image and blue image;
   a controller electrically connected to the color separation unit, the controller being configured for calculating MTF values of the image and determining a shooting distance between the lens module and the object; and
   a shape memory alloy driver electrically connected to the controller;
   wherein, when the shooting distance is greater than a predetermined distance value, the controller processes the image according to the MTF values to compensate blurs of the image caused by out of focus; when the shooting distance is equal to or less than the predetermined distance value, the controller controls the shape memory alloy to drive the lens module to an optimum focusing position for focus according to the MTF values.

2. The auto-focusing camera module of claim 1, wherein the image sensor comprises a plurality of pixel unit arranged in its sensing area, each pixel unit comprises a red pixel, a green pixel and a blue pixel, the image formed by the image sensor comprises a plurality of image portions, each of which corresponds to a pixel unit.

3. The auto-focusing camera module of claim 2, wherein the controller comprises:
   a MTF calculating module configured for calculating MTF values of each image portion of the image;
   an object distance calculating module configured for calculating an object distance of an object in each image portion of the image according to the MTF values;
   an shooting distance judging module configured for determining the shooting distance according to the object distances;
   a blur calculating module configured for comparing the MTF values of each image portion calculated by the MTF calculating module with corresponding predetermined MTF values, calculating the differences between the MTF values and the predetermined MTF values, and generating blur quantities of each image portion of the image according to the MTF value differences;
   an offset calculating module configured for calculating offset to compensate a blur of each image portion according to the blur quantities;
   a focus calculating module configured for calculating an optimum focusing position of the lens module according to the object distance of the object in each image portion; and
   a driving current calculating module configured for calculating a driving current to be provided to the shape memory alloy according to the optimum focusing position calculated by the focus calculating module; and
   an image processing module configured for compensating any blurring of each image portion of the image according to the offsets calculated by the offset calculating module.

4. The auto-focusing camera module of claim 3, wherein the MTF calculating module respectively calculates MTF values of each image portion of the red image, the green image and the blue image.

5. The auto-focusing camera module of claim 3, wherein when the shooting distance is greater than the predetermined distance, the blur calculating module switches on and the focus calculating module switches off; when the shooting distance is equal to or less than the predetermined distance, the blur calculating module switches off and the focus calculating module switches on.

6. The auto-focusing camera module of claim 5, wherein the shooting distance judging module analyzes the object distances calculated by the object distance calculating module to get an analysis result, compares the analysis result with the predetermined distance value, and determines the shooting distance.

7. The auto-focusing camera module of claim 6, wherein the shooting distance judging module analyzes the object distances of the image portions and generates a main object distance representing the object distance of a main object in the image.

8. The auto-focusing camera module of claim 1, wherein the predetermined distance value is 40 cm.

9. The auto-focusing camera module of claim 1, wherein the lens module comprises a lens barrel, a base, and at least one piece of lens received in the lens barrel, the center axis of the at least lens is defined as an optical axis of the lens module; the lens barrel is hollow and comprises a cylindrical main portion and an annular protruding portion extending from one end of the main portion along a direction away from the optical axis, an outer diameter of the protrusion is greater than an outer diameter of the main portion, the base is tubular and defines an upper receiving hole and a lower receiving hole communicated and coaxial with the upper receiving hole, a diameter of the upper receiving hole is greater than a diameter of the lower receiving hole and the outer diameter of the protruding portion, the diameter of the lower receiving hole corresponds to the outer diameter of the main portion, the upper receiving hole receives the protruding portion; the upper receiving hole and the lower receiving hole cooperatively receive the main portion, the base comprises a cylindrical first inner surface on the upper receiving hole, a cylindrical second inner surface 1 on the lower receiving hole, and a connection surface connecting the first inner surface and the second inner surface, the auto-focusing camera module further comprises two guide poles, the guide poles are mounted to the connection surface and pass through the protruding portion, the guide poles are arranged in direction parallel to the optical axis of the lens module.

10. The auto-focusing camera module of claim 9, wherein the protruding portion defines two guiding holes extending along a direction parallel to the optical axis, the connection surface faces the protruding portion and defines two mounting holes, each mounting hole is a threaded blind hole and corresponds to a guiding hole, each guiding pole comprises a threaded end screwed in a corresponding mounting hole, the other end opposite to the threaded end of each guiding pole is received in a corresponding guiding hole.

11. The auto-focusing camera module of claim 10, wherein the two guiding holes pass through the protruding portion, and the two guiding holes and the optical axis are arranged in the same plane.

12. The auto-focusing camera module of claim 10, wherein the connection surface is perpendicular to the optical axis.

13. The auto-focusing camera module of claim 9, wherein the shape memory alloy driver comprises two sub-driver assemblies, each of the sub-driver assemblies comprises a shape memory alloy wire, a first fastening element, a second fastening element, and a hanging element; the first fastening element is made of metal and mounted on the protruding portion, the second fastening element is made of metal and mounted on the connection surface, the hanging element is arched with two ends which are mounted on the first inner surface, each of the two ends of the shape memory alloy wire is connected to one of the first fastening element and the second fastening element, the shape memory alloy wire passes through the hanging element and is hanged on the hanging element with the shape memory alloy wire in a tense state.

14. The auto-focusing camera module of claim 13, wherein a distance between the hanging element and the connection surface is greater than a distance between the first fastening element and the connection surface.

15. The auto-focusing camera module of claim 13, wherein the two sub-driver assemblies are symmetrically arranged along a diameter direction of the lens barrel.

* * * * *